(12) United States Patent
Park et al.

(10) Patent No.: US 10,663,972 B2
(45) Date of Patent: May 26, 2020

(54) APPARATUS FOR LOCALIZING CLEANING ROBOT, CLEANING ROBOT, AND CONTROLLING METHOD OF CLEANING ROBOT

(71) Applicant: SAMSUNG ELECTRONICS CO., LTD., Suwon-si, Gyeonggi-do (KR)

(72) Inventors: Soon Yong Park, Bucheon-si (KR); No San Kwak, Suwon-si (KR); Kyung Shik Roh, Seongnam-si (KR); Suk June Yoon, Seoul (KR); So Hee Lee, Seoul (KR); Min Yong Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 354 days.

(21) Appl. No.: 15/203,079

(22) Filed: Jul. 6, 2016

(65) Prior Publication Data

US 2017/0083023 A1    Mar. 23, 2017

(30) Foreign Application Priority Data

Sep. 18, 2015 (KR) .................. 10-2015-0132274
Oct. 26, 2015 (KR) .................. 10-2015-0148434

(51) Int. Cl.
    *G05D 1/02* (2020.01)
(52) U.S. Cl.
    CPC ........... *G05D 1/0219* (2013.01); *G05D 1/024* (2013.01); *G05D 1/0274* (2013.01); *G05D 2201/0203* (2013.01); *G05D 2201/0215* (2013.01)

(58) Field of Classification Search
    None
    See application file for complete search history.

(56) References Cited

U.S. PATENT DOCUMENTS 8,060,254 B2 * 11/2011 Myeong ............... G05D 1/0274
                                                   700/245
2008/0046125 A1   2/2008 Myeong et al.
                        (Continued)

FOREIGN PATENT DOCUMENTS

CN   101093503   12/2007
CN   101126645   2/2008
             (Continued)

OTHER PUBLICATIONS

Extended European Search Report dated Feb. 21, 2017 from European Patent Application No. 16176784.3, 8 pages.
(Continued)

*Primary Examiner* — John Olszewski
*Assistant Examiner* — Gerrad A Foster
(74) *Attorney, Agent, or Firm* — Staas & Halsey LLP

(57) ABSTRACT

A cleaning robot includes a data acquisition unit that acquires actual sensor data by measuring a distance from a current position to an object to be measured; a local map acquisition unit that acquires a local map by scanning the vicinity of the current position based on an environmental map stored in advance; and a processor that determines coordinates of the current position for the local map by performing matching between the local map and the actual sensor data, and determines a traveling direction based on the current position by calculating a main segment angle of a line segment existing in the local map.

16 Claims, 27 Drawing Sheets

(56) References Cited

U.S. PATENT DOCUMENTS

| | | | | |
|---|---|---|---|---|
| 2009/0292394 A1* | 11/2009 | Hyung | .................. | G05D 1/027 |
| | | | | 700/251 |
| 2014/0207282 A1* | 7/2014 | Angle | ..................... | G06F 15/16 |
| | | | | 700/257 |
| 2015/0012209 A1 | 1/2015 | Park et al. | | |

FOREIGN PATENT DOCUMENTS

| | | |
|---|---|---|
| CN | 104848848 | 8/2015 |
| JP | 2006-209644 | 8/2006 |
| JP | 2014-211862 | 11/2014 |
| KR | 1994-0023433 | 11/1994 |
| KR | 10-2007-0120780 | 12/2007 |
| KR | 10-2011-0085500 | 7/2011 |
| KR | 10-2011-0132659 | 12/2011 |
| KR | 10-2013-0099667 | 9/2013 |
| KR | 10-2014-0045848 | 4/2014 |
| KR | 10-2015-0050159 | 5/2015 |
| KR | 10-2015-0136872 | 12/2015 |

OTHER PUBLICATIONS

Chinese Office Action dated Jul. 2, 2018 from Chinese Patent Application No. 201610773063.X, 23 pages.
Chinese Office Action dated Apr. 1, 2019 in corresponding Chinese Patent Application No. 201610773063.X (8 pages).
Chinese Office Action dated Oct. 9, 2019 in corresponding Chinese Patent Application No. 201610773063.X.

\* cited by examiner

FIG. 2
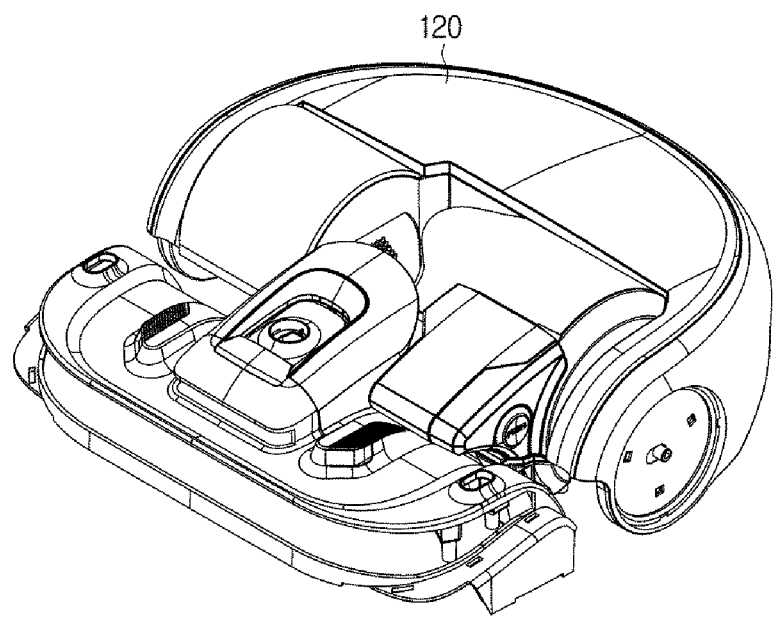
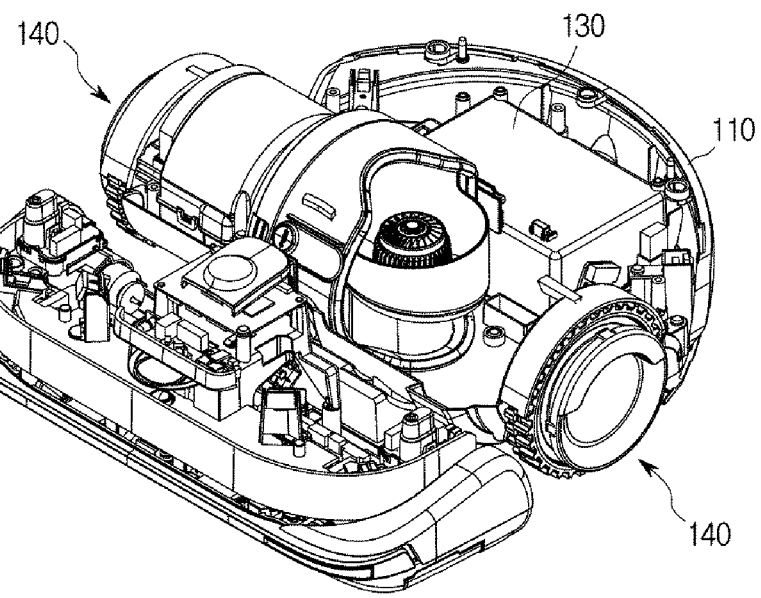

APPARATUS FOR LOCALIZING CLEANING ROBOT, CLEANING ROBOT, AND CONTROLLING METHOD OF CLEANING ROBOT

CROSS-REFERENCE TO RELATED APPLICATIONS

This application claims the benefit of Korean Patent Application Nos. 10-2015-0132274, filed on Sep. 18, 2015 and 10-2015-0148434, filed on Oct. 26, 2015, respectively, in the Korean Intellectual Property Office, the disclosures of which are incorporated herein by reference.

BACKGROUND

1. Field

Embodiments of the present disclosure relate to an apparatus for localizing a cleaning robot, the cleaning robot, and a control method for the cleaning robot.

2. Description of the Related Art

A cleaning robot is an apparatus that cleans impurities such as dust from the floor while traveling an area to be cleaned by itself even without a user's operation, and performs a cleaning operation while traveling according to a traveling pattern set in advance. In addition, the cleaning robot determines a distance to obstacles such as furniture, walls, appliances, or the like installed in a cleaning area using a sensor, and switches a direction by itself by selectively driving a left motor and a right motor.

In order for the above-described cleaning robot to perform a smooth cleaning operation in a variety of cleaning environments, it is important to accurately determine its position. The determination of the position of the cleaning robot is achieved in such a manner as to estimate a current position of the cleaning robot using data measured by an environmental map in which the cleaning robot is operated and a sensor.

A technique that is most commonly used as a method of determining the position using a map is a Monte Carlo localization (hereinafter, referred to as "MCL") method based on a particle filter. In the MCL method in which a particle filter is implemented to determine the position of the cleaning robot, particles indicating a virtual position of the cleaning robot within a predetermined area are randomly sampled on a map (random sampling), and the cleaning robot repeatedly performs an operation for converging the particles while moving a predetermined distance in an arbitrary direction. Through this process, the particles may be finally converged into one position, and the converged position may be recognized as the current position of the cleaning robot.

However, such a localization method is likely to fail to localize the cleaning robot when the number of the used particles is small, and a calculation time for localization is increased when the number of the particles is large. In addition, the cleaning robot should meaninglessly move the predetermined distance in the arbitrary direction in order to converge the particles into one position, which is significantly inefficient.

In addition, assuming that the cleaning robot is placed to be inclined against a wall surface, when the cleaning robot starts to clean while maintaining a direction in which the cleaning robot is initially positioned, an inefficient traveling route may be generated, so that there may be a lot of areas in which cleaning is missed.

Therefore, there is the need to accurately determine a traveling direction of a cleaning robot so that the cleaning robot may travel all areas of the cleaning space.

SUMMARY

Therefore, it is an aspect of the present disclosure to provide an apparatus for localizing a cleaning robot, which may quickly and accurately recognize a current position of the cleaning robot in place without an unnecessary movement when the cleaning robot is moved to an arbitrary position by a user and determine a traveling direction of the cleaning robot using an environmental map in which the cleaning robot performs a cleaning operation and a position of the cleaning robot on the map, the cleaning robot, and a control method of the cleaning robot.

Additional aspects of the disclosure will be set forth in part in the description which follows and, in part, will be apparent from the description, or may be learned by practice of the disclosure.

In accordance with one aspect of the present disclosure, a cleaning robot includes: a data acquisition unit that acquires actual sensor data by measuring a distance from a current position to an object to be measured; a local map acquisition unit that acquires a local map by scanning the vicinity of the current position based on an environmental map stored in advance; and a processor that determines coordinates of the current position for the local map by performing matching between the local map and the actual sensor data, and determines a traveling direction based on the current position by calculating a main segment angle of a line segment existing in the local map.

The processor may determine the main segment angle by classifying a plurality of straight lines existing in the local map according to angles.

The processor may rotate the traveling direction of the cleaning robot in place on the basis of the traveling direction determined based on the coordinates of the current position.

The data acquisition unit may acquire the actual sensor data in a state in which the cleaning robot is stopped, acquires the actual sensor data while the cleaning robot rotates at a predetermined angle in place, or acquires the actual sensor data for all directions while the cleaning robot rotates at an angle of 360 degrees in place.

The local map acquisition unit may extract virtual sensor data by performing a ray casting method on all directions while the cleaning robot rotates at an angle of 360 degrees in a virtual sensor data extraction position selected with respect to the current position of the cleaning robot, and thereby acquires the local map.

The local map acquisition unit may extract the local map having a predetermined size with respect to each of a plurality of local map extraction positions selected with respect to the current position of the cleaning robot, from the environmental map.

The processor may further include: a position estimation unit that determines current position coordinates of the cleaning robot for the local map, a segment angle calculation unit that calculates a main segment angle of a line segment existing in the local map, and a direction adjustment unit that rotates the traveling direction of the cleaning robot in the current position according to the main segment angle.

The position estimation unit may further include: a corresponding point acquisition unit that acquires a plurality of corresponding points through data matching between the actual sensor data and the local map, a relative position calculation unit that calculates a relative position of the actual sensor data for the local map using the acquired plurality of corresponding points, a similarity calculation unit that calculates similarity between a plurality of local maps and the actual sensor data, and a position determination unit that determines a relative position of the cleaning robot for the local map having the highest similarity as the current position of the cleaning robot for the environmental map, and thereby determines the current position coordinates.

The similarity calculation unit may obtain higher similarity along with an increase in the number of data points which are commonly included in the local map and the actual sensor data.

The segment angle calculation unit may further include: a straight line acquisition unit that acquires a plurality of straight lines from the local map, and a main segment angle calculation unit that classifies the plurality of straight lines according to angles and determines the main segment angle.

The cleaning robot may further include: a sensor that measures a distance, wherein the data acquisition unit acquires the actual sensor data by measuring a distance from the sensor to the object to be measured using the sensor.

In accordance with one aspect of the present disclosure, a control method of a cleaning robot includes: acquiring a local map by scanning the vicinity of a current position; acquiring actual sensor data by measuring a distance from the current position to an object to be measured; determining current position coordinates for the local map by performing matching between the local map and the actual sensor data; determining a traveling direction by calculating a main segment angle of a line segment existing in the local map; and adjusting the traveling direction according to the calculated main segment angle.

The acquiring of the local map may include acquiring the local map by scanning the vicinity of the current position based on an environmental map stored in advance in which the cleaning robot travels.

The acquiring of the local map may further include: extracting virtual sensor data by performing a ray casting method on all directions while the cleaning robot rotates at an angle of 360 degrees in a virtual sensor data extraction position selected with respect to the current position of the cleaning robot to thereby acquire the local map, or extracting the local map having a predetermined size with respect to each of a plurality of local map extraction positions selected with respect to the current position of the cleaning robot from the environmental map.

The determining of the current position coordinates may further include: acquiring a plurality of corresponding points through data matching between the actual sensor data and the local map, calculating a relative position of the actual sensor data to the local map using the acquired plurality of corresponding points, calculating similarity between a plurality of local maps and the actual sensor data, and determining the relative position of the cleaning robot to the local map having the highest similarity as the current position of the cleaning robot for the environmental map.

The calculating of the similarity may include determining that higher similarity is obtained along with an increase in the number of data points which are commonly included in the local map and the actual sensor data.

The determining of the traveling direction may further include: acquiring a plurality of straight lines from the local map, and calculating the main segment angle by classifying the plurality of straight lines according to angles.

The calculating of the main segment angle may further include: generating an angle histogram by classifying the plurality of straight lines according to the angles, and determining the main segment angle in consideration of distribution of the angle histogram.

In accordance with one aspect of the present disclosure, a localization apparatus for a cleaning robot which recognizes a position of the cleaning robot moved to an arbitrary position by a user includes: a data acquisition unit that acquires actual sensor data by measuring a distance from a sensor installed in the cleaning robot to an object to be measured in the arbitrary position; a local map acquisition unit that acquires a local map by scanning the vicinity of the arbitrary position based on map information of an environment in which the cleaning robot is operated; and a processor that recognizes a relative position of the cleaning robot for the local map by performing matching between the local map and the actual sensor data.

The localization apparatus for the cleaning robot may further include: a display unit that displays information for notifying that localization of the cleaning robot is completed; and a sound output unit that notifies that the localization of the cleaning robot is completed.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 2 is a schematic view showing the appearance of a cleaning robot according to an embodiment of the present disclosure.

DETAILED DESCRIPTION

Figure 1:
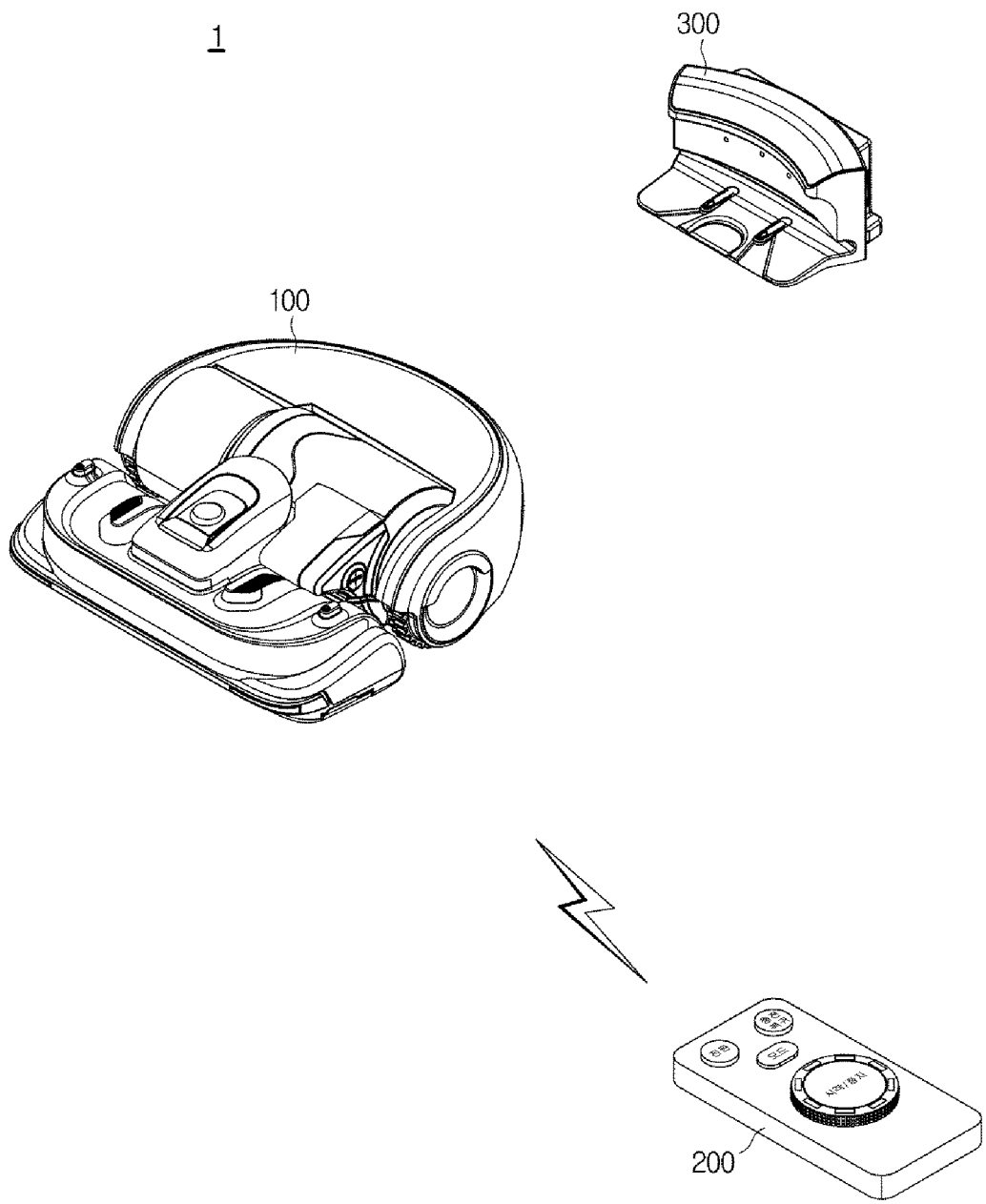
FIG. 1 is a view showing the entire configuration of a cleaning robot system according to an embodiment of the present disclosure.

Advantages and features of the present invention and a method for achieving the same will become explicit by referring to the exemplary embodiments that are described in detail in the following with reference to the accompanying drawings. In adding reference numerals to components throughout the drawings, it is to be noted that like reference numerals designate like components even though components are shown in different drawings. Further, when it is determined that the detailed description of the known art related to the present invention may obscure the gist of the present invention, the detailed description thereof will be omitted. In the present specification, terms such as first, second, and the like are used to distinguish one component from other components, and therefore components are not limited to the above terms.

Hereinafter, preferred embodiments of the present disclosure will be described in detail with the accompanying drawings.

FIG. 1 is a view showing the entire configuration of a cleaning robot system according to an embodiment of the present disclosure.

Referring to FIG. 1, a cleaning robot system 1 includes a cleaning robot 100 that performs an operation while autonomously moving in a predetermined area, a device 200 that is separated from the cleaning robot 100 and remotely controls the cleaning robot 100, and a charge station 300 that is separated from the cleaning robot 100 and charges a battery power source of the cleaning robot 100.

The cleaning robot 100 is an apparatus that receives a control command of the device 200 and performs an operation corresponding to the control command, and includes a chargeable battery and an obstacle sensor for helping the cleaning robot in avoiding an obstacle during traveling so that the cleaning robot may perform a cleaning operation while autonomically traveling an operation area.

In addition, the cleaning robot 100 may recognize its own position without prior information about the vicinity of the cleaning robot 100 using a camera or a variety of sensors, and perform a process for localization and map-building that creates a map from information about the surroundings.

The device 200 is a remote controller that controls the movement of the cleaning robot 100 or transmits a control command for performing an operation of the cleaning robot 100 in a wireless manner, and may include cell phones, smart phones, PDA (personal digital assistants), PMP (portable multimedia player), laptop computers, digital broadcast terminals, netbooks, tablets, navigations, etc.

In addition, the device 200 includes all devices of which various functions can be implemented using various application programs, such as digital cameras with built-in wired and wireless communication functions or camcorders.

In addition, the device 200 may be a simple type general remote control. The remote control may transmit and receive signals to and from the cleaning robot 100 generally using IrDA (infrared data association).

In addition, the device 200 may transmit and receive wireless communication signals to and from the cleaning robot 100 using various methods such as RF (radio frequency), W-Fi (wireless fidelity), Bluetooth, Zigbee, NFC (near field communication), UWB (ultra wide band) communication, and the like, and any method may be used as long as the device 200 can transmit and receive wireless communication signals to and from the cleaning robot 100.

In addition, the device 200 may include a power button for controlling ON and OFF of a power source of the cleaning robot 100, a charge return button for instructing the cleaning robot 100 to return to the charge station 300 in order to charge the battery of the cleaning robot 100, a mode button for changing a control mode of the cleaning robot 100, a start and stop button for starting or stopping an operation of the cleaning robot 100 or starting, canceling, and confirming a control command, a dial, and the like.

The charge station 300 is a component for charging the battery of the cleaning robot 100, a guide member (not shown) for guiding the cleaning robot 100 to be docked is provided in the charge station 300, and a connection terminal (not shown) for charging a power source unit (130, see FIG. 2) provided in the cleaning robot 100 is provided in the guide member (not shown).

FIG. 2 is a schematic view showing the appearance of a cleaning robot according to an embodiment of the present disclosure.

As shown in FIG. 2, the cleaning robot 100 includes a main body 110 that forms the appearance, a cover 120 that covers an upper portion of the main body 110, the power source unit 130 that supplies a driving power source for driving the main body 110, and a driving unit 140 that moves the main body 110.

The main body 110 forms the appearance of the cleaning robot 100 and supports various components installed therein.

The power source unit 130 includes a battery that is electrically connected to the driving unit 140 and each of loads for driving the main body 110 and supplies a driving power source. The battery is provided as a rechargeable secondary battery, and charged by receiving supply of electric power from the charge station 300 when the main body 110 completes an operation and then is coupled to the charge station 300.

In addition, when a remaining charge amount is insufficient, the power source unit 130 is charged by receiving supply of a charging current from the charge station 300.

In addition, a caster wheel (not shown) by which a rotation angle of the cleaning robot 100 is changed depending on the state of a bottom surface on which the cleaning robot 100 moves may be installed at a front side of the main body 110. The caster wheel is utilized in the posture stability and fall prevention of the cleaning robot 100 to support the cleaning robot 100, and is constituted of a roller or a caster-shaped wheel.

The driving unit 140 may be respectively provided at both sides of a center portion of the main body 110, and makes movement operations such as forward movement, backward movement, rotation, and the like possible during traveling of the main body 110.

The driving unit 140 may be rotated in a forward direction or a backward direction according to a command of a processor (180, see FIG. 3) to be described later so that the cleaning robot 100 may move forward or backward or rotate. For example, the cleaning robot 100 may travel forward or backward by rotating the driving unit 140 in the forward or backward direction. In addition, the cleaning robot 100 may rotate in a left direction on the basis of the front by rotating the right driving unit 140 in the forward direction while the left driving unit 140 is rotated in the backward direction, and rotate in a right direction on the basis of the front by rotating the left driving unit 140 in the forward direction while the right driving unit 140 is rotated in the backward direction.

Figure 3:
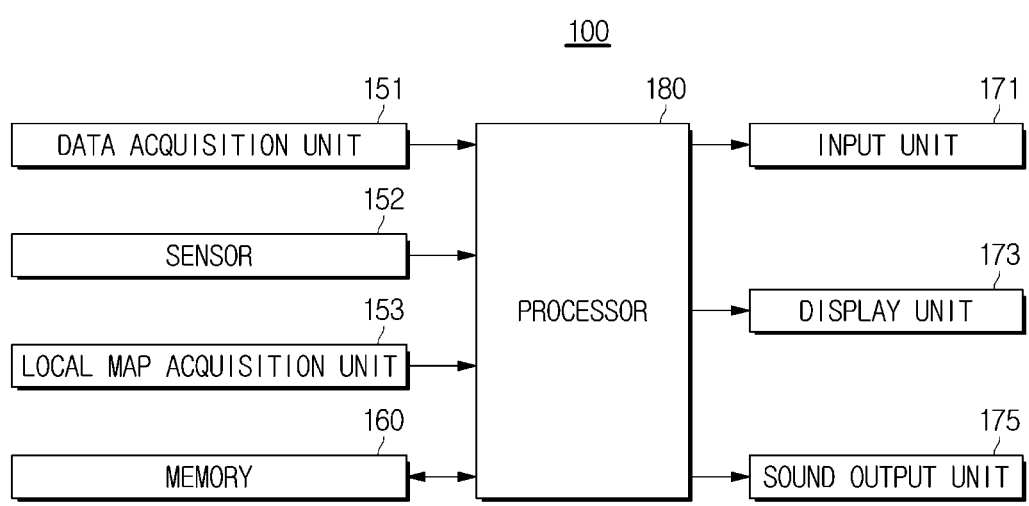
FIG. 3 is a control block diagram showing components of a cleaning robot according to an embodiment of the present disclosure.

FIG. 3 is a control block diagram showing components of a cleaning robot according to an embodiment of the present disclosure.

As shown in FIG. 3, the cleaning robot 100 may include a data acquisition unit 151, a sensor 152, a local map acquisition unit 153, a memory 160, an input unit 171, a display unit 173, a sound output unit 175, and a processor 180 in addition to the components shown in FIG. 2.

The data acquisition unit 151 is a component that acquires actual sensor data of a space in which the cleaning robot 100 is currently positioned, and may acquire the actual sensor data by measuring a distance from a current position of the cleaning robot 100 to an object to be measured.

More specifically, the cleaning robot 100 may include a sensor 152 for measuring a distance, and acquire actual sensor data of a real environment in which the cleaning robot 100 is positioned by measuring a distance from the sensor 152 to an object to be measured according to scanning of a two-dimensional (2D) sensor or a three-dimensional (3D) sensor installed in the cleaning robot 100. The sensor 152 may be a 2D sensor or a 3D sensor.

At this time, the 2D sensor may represent the distance to the object to be measured as (x, y) coordinates based on a reference coordinate system of the sensor, and the 3D sensor may represent the distance to the object to be measured as (x, y, z) coordinates based on the reference coordinate system of the sensor. The number of pieces of distance data output from such a 2D or 3D sensor may vary depending on FoV (field of view) and resolution of the sensor.

That is, the data acquisition unit 151 may change an actual sensor data acquisition method of the cleaning robot 100 depending on the FoV of the 2D or 3D sensor. When the FoV of the sensor is sufficiently secured, the cleaning robot 100 acquires actual sensor data in a stop state. Alternatively, the cleaning robot 100 acquires the actual sensor data while rotating at a predetermined angle in place, or acquires actual sensor data for all directions while rotating at an angle of 360 degrees in place.

At this time, when acquiring the actual sensor data while rotating at the predetermined angle in place, the cleaning robot 100 may acquire the actual sensor data outside the FoV of the sensor.

The local map acquisition unit 153 may acquire a local map by scanning the vicinity of the current position based on an environmental map stored in advance.

More specifically, the local map acquisition unit 153 acquires a local map for the vicinity of the current position of the cleaning robot 100 using virtual sensor data extracted based on the environmental map stored in the memory 160.

Figure 4:
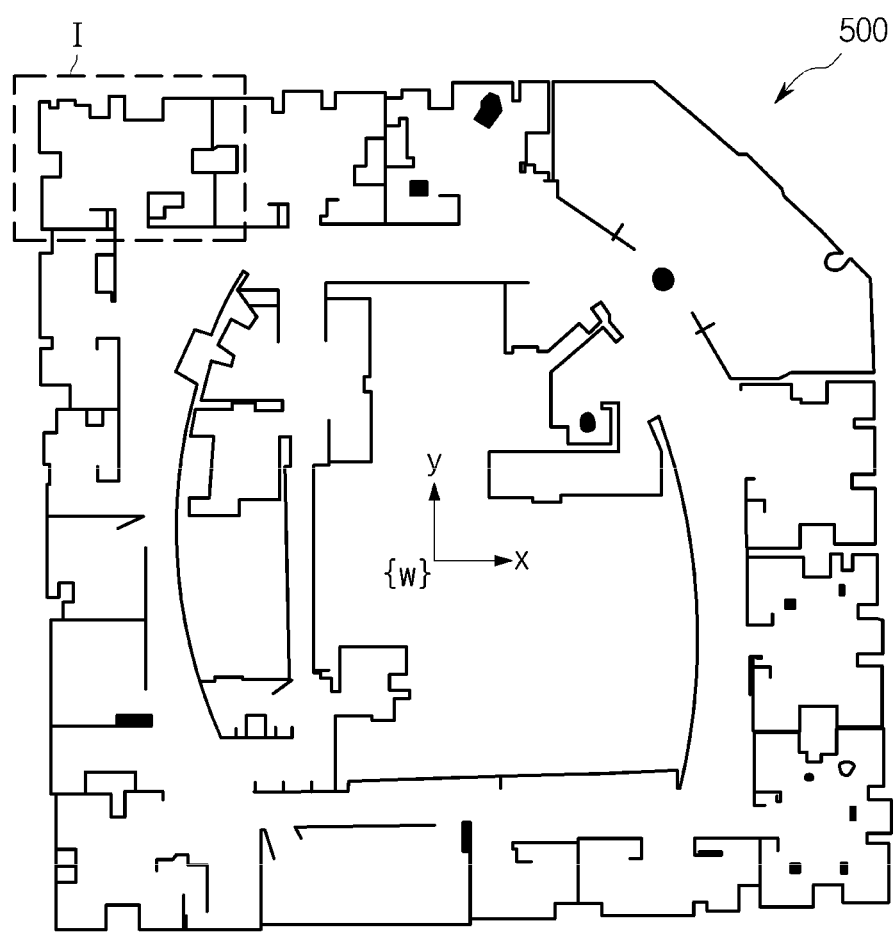
FIG. 4 is a view showing an environmental map in which a cleaning robot is driven according to an embodiment of the present disclosure.

At this time, the environmental map in which the cleaning robot is operated may be the same as that in FIG. 4. It is assumed that an environmental map 500 in which the cleaning robot 100 is operated is given in advance. As shown in FIG. 4, the environmental map 500 may be a 2D grid map or a 3D grid map. The grid map is a map in which the vicinity of the cleaning robot 100 is divided into small grids and a probability that an object exists in each grid is stochastically represented, and also referred to as a probability grid map.

Hereinafter, a case in which the cleaning robot 100 is located in an area I within the environmental map 500 will be described.

In the disclosed invention, three different methods utilizing a 2D grid map as an example of acquisition of the local map are proposed. It is obvious that these methods can be expand and applied to a 3D grid map.

Figure 5:
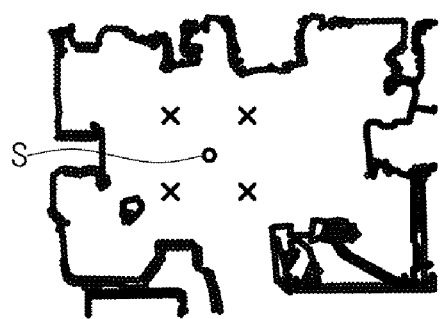
FIG. 5 is a view showing an extraction position of virtual sensor data in a current position of a cleaning robot according to an embodiment of the present disclosure.
Figure 6:
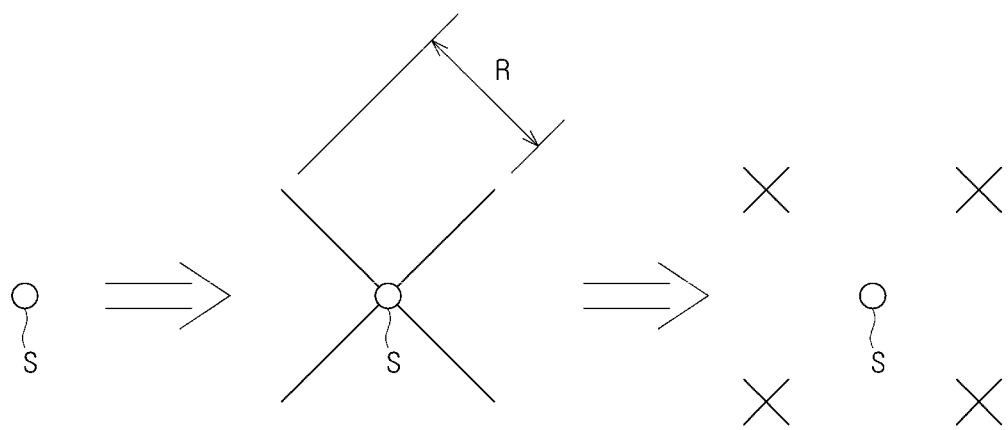
FIG. 6 is a view showing a method of calculating the extraction position of the virtual sensor data of FIG. 5.
Figure 7:
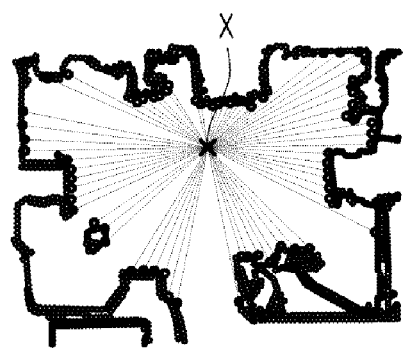
FIG. 7 is a view showing an example of a ray casting method according to an embodiment of the present disclosure.
Figure 8:
FIG. 8 is a view showing an example of virtual sensor data extracted using the ray casting method of FIG. 7.

FIG. 5 is a view showing an extraction position of virtual sensor data in a current position of a cleaning robot according to an embodiment of the present disclosure, FIG. 6 is a view showing a method of calculating the extraction position of the virtual sensor data of FIG. 5, FIG. 7 is a view showing an example of a ray casting method according to an embodiment of the present disclosure, and FIG. 8 is a view showing an example of virtual sensor data extracted using the ray casting method of FIG. 7.

First, the local map acquisition unit 153 may acquire a local map through a virtual sensor data extraction method.

The local map acquisition unit 153 may extract virtual sensor data by performing a ray casting method on all directions while the cleaning robot 100 rotates at an angle of 360 degrees at a virtual sensor data extraction position selected with respect to a current position, thereby acquiring the local map.

As shown in FIG. 5, the cleaning robot 100 selects a plurality of virtual sensor data extraction positions X on a map within a predetermined distance with respect to a current position S.

As to the virtual sensor data extraction positions X, points at which lines perpendicular to each other with respect to the current position S cross a radius R may be determined as the extraction positions X (see FIG. 6).

In FIG. 6, four end points of segments of which a length of one side is 2R become the extraction positions X of the virtual sensor data.

Next, the virtual sensor data may be extracted as shown in FIG. 8 by performing a ray casting method on all directions of 360 degrees in each of the virtual sensor data extraction positions X. FIG. 8 shows an example of virtual sensor data extracted from a virtual sensor data extraction position X, as shown in FIG. 7.

Figure 9:
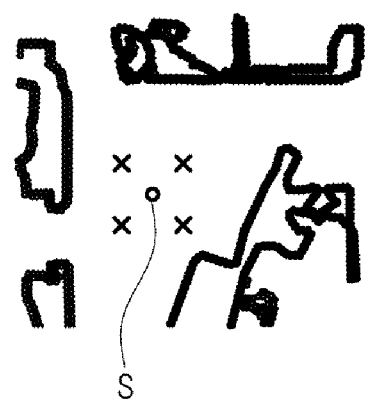
FIG. 9 is a view showing a position in which a small local map is extracted from a current position of a cleaning robot according to an embodiment of the present disclosure.
Figure 10:
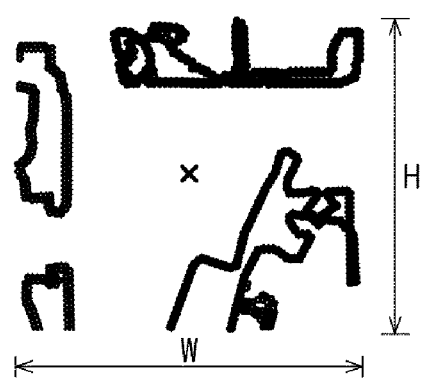
FIG. 10 is a view showing an example of a small local map extracted using a small local map extraction position.

FIG. 9 is a view showing a position in which a small local map is extracted from a current position of a cleaning robot according to an embodiment of the present disclosure, and FIG. 10 is a view showing an example of a small local map extracted using a small local map extraction position.

Second, the local map acquisition unit 153 may extract a local map having a preset size from the environmental map 500 with respect to each of a plurality of local map extraction positions selected with respect to the current position of the cleaning robot 100.

At this time, the local map may be classified into a small local map and a large local map having an area larger than the small local map according to the preset size.

Referring to FIG. 9, the local map acquisition unit 153 selects a plurality of small local map extraction positions X on a map within a predetermined distance with respect to the current position S of the cleaning robot 100.

Referring to FIG. 10, the local map acquisition unit 153 determines a width W and a height H of the small local map based on a maximum detection distance of a sensor mounted in the cleaning robot 100. The local map having a size (W×H) determined with respect to each of the small local map extraction positions X is extracted from the environmental map. FIG. 10 shows an example of a small local map extracted from the displayed small local map extraction positions X.

When an extraction method of the large local map is applied, the local map acquisition unit 153 extracts an area wider than the small local map from the environmental map using the current position S of the cleaning robot 100 as a center of large local map extraction.

The processor 180 may determine coordinates of the current position for the local map by performing matching between the local map and actual sensor data, and calculate a main segment angle of a line segment existing in the local map, thereby determining a traveling direction with respect to the current position. At this time, the coordinates of the current position may be defined as (x, y, θ) based on the reference coordinate system {W} displayed on the environmental map shown in FIG. 4. Here, x and y denote position coordinates based on the reference coordinate system, and θ denotes a rotation angle.

That is, the processor 180 is a component that controls overall operations of the cleaning robot 100, and may recognize a relative position of the cleaning robot 100 for the local map by performing matching between the local map and sensor data and determine the traveling direction on the relative position of the cleaning robot 100.

In addition, the processor 180 may determine the main segment angle by classifying a plurality of straight lines existing in the local map according to the angles.

In addition, the processor 180 may cause the cleaning robot 100 to rotate in place based on the traveling direction determined based on the coordinates of the current position.

Figure 11:
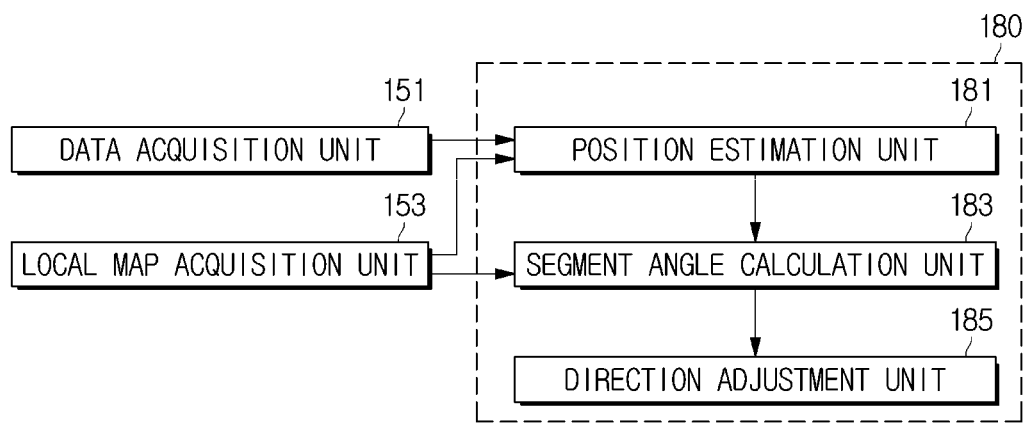
FIG. 11 is a control block diagram showing the processor of FIG. 3, in detail.

Referring to FIG. 11, the processor 180 may include a position estimation unit 181 for determining current position coordinates of the cleaning robot 100 for the local map, a segment angle calculation unit 183 for calculating a main segment angle of a line segment existing in the local map, and a direction adjustment unit 185 for adjusting the traveling direction of the cleaning robot 100 so that the cleaning robot 100 may rotate according to the main segment angle in a current position.

Figure 12:
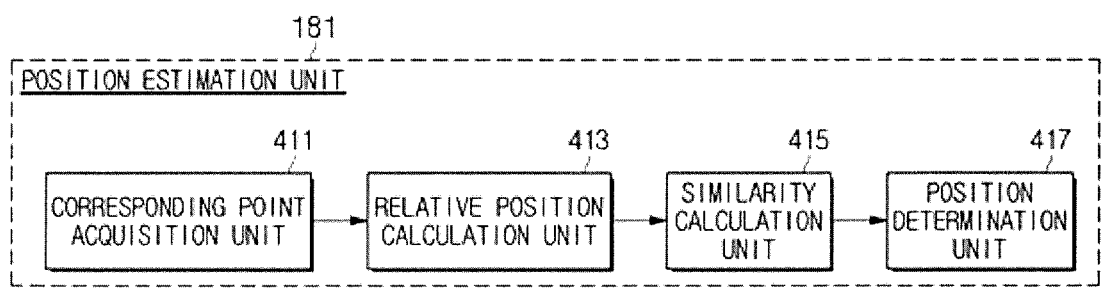
FIG. 12 is a control block diagram showing the position estimation unit of FIG. 11, in detail.

FIG. 12 is a control block diagram showing the position estimation unit of FIG. 11, in detail.

As shown in FIG. 12, a position estimation unit 181 may include a corresponding point acquisition unit 411, a relative position calculation unit 413, a similarity calculation unit 415, and a position determination unit 417.

The corresponding point acquisition unit 411 acquires a plurality of corresponding points through data matching between actual sensor data acquired by the data acquisition unit 151 and a local map acquired by the local map acquisition unit 153.

Figure 13:
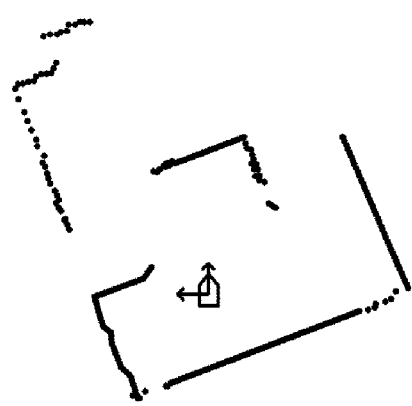
FIG. 13 is a view showing an example of actual sensor data acquired by a cleaning robot according to an embodiment of the present disclosure.
Figure 14:
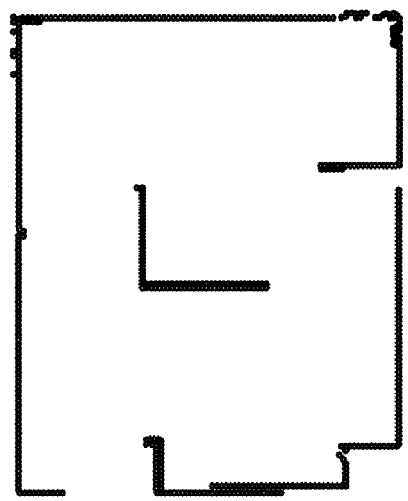
FIG. 14 is a view showing an example of virtual sensor data acquired by a cleaning robot according to an embodiment of the present disclosure.

FIG. 13 is a view showing an example of actual sensor data acquired by a cleaning robot according to an embodiment of the present disclosure, and FIG. 14 is a view showing an example of virtual sensor data acquired by a cleaning robot according to an embodiment of the present disclosure.

Referring to FIGS. 13 and 14, each sensor data is constituted of a plurality of data points. For example, when an arbitrary point P is included in actual sensor data as P1 and in virtual sensor data as P2, P1 and P2 are in a corresponding point relationship. In a case of a 2D sensor, data points constituting the actual sensor data are respectively defined as (x, y) based on a reference coordinate system of the cleaning robot 100. Data points constituting the virtual sensor data are defined as (x, y) based on a reference coordinate system {W} (see FIG. 4) of an environmental map.

In this manner, the corresponding point acquisition unit 411 acquires the data points of the actual sensor data which are respectively defined as (x, y) based on the reference coordinate system of the cleaning robot 100 and the data points of the virtual sensor data which are respectively defined as (x, y) based on the reference coordinate system of the environmental map.

In addition, the corresponding point acquisition unit 411 may remove outliers among the acquired plurality of corresponding points. At this time, the outliers refer to data points which are not commonly included in the actual sensor data and the virtual sensor data.

The relative position calculation unit 413 calculates a relative position of the actual sensor data for the local map, that is, a coordinate transformation parameter (rotation and translation) using the plurality of corresponding points acquired by the corresponding point acquisition unit 411.

The relative position calculation unit 413 calculates the remaining plurality of corresponding points (inliers) obtained by removing the outliers, as the relative position of the actual sensor data for the local map.

At this time, the relative position may be obtained by calculating a coordinate transformation parameter (rotation and translation) for fitting the plurality of corresponding points (inliers) included in the actual sensor data into a plurality of corresponding points (inliers) corresponding to each of data points of the local map. Each of the data points of the local map may be defined based on the reference coordinate system of the environmental map, and therefore the coordinate transformation parameter for fitting the actual sensor data indicates the relative position of the cleaning robot 100 for the environmental map.

Figure 15:
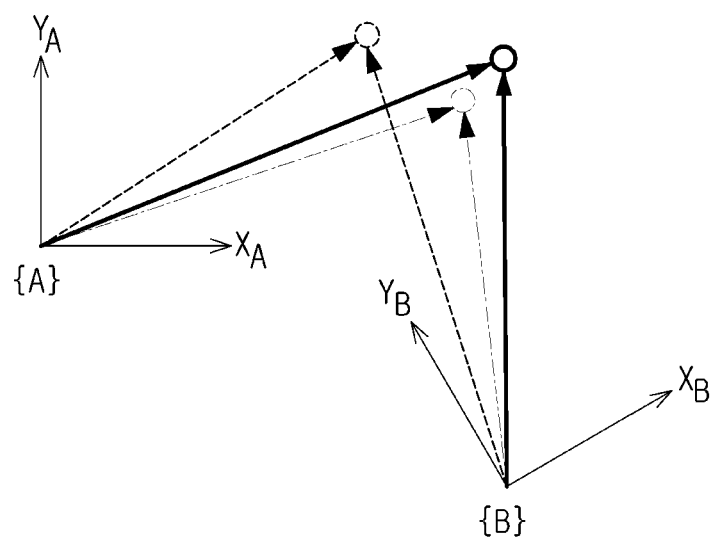
FIG. 15 is a view for explaining a method of calculating a relative position of the actual sensor data for the local map according to an embodiment of the present disclosure.

Referring to FIG. 15, a coordinate system {A} may be referred to as a reference coordinate system of a local map and a coordinate system {B} may be referred to as a reference coordinate system of a sensor.

As shown in FIG. 15, when data points PA constituting the local map and data points PB of the actual sensor data correspond to each other, a relationship of Equation 1 may be obtained.

$$P_A = R \cdot P_B + t \quad \text{[Equation 1]}$$

At this time, R and t denote the coordinate transformation parameter, R denotes a rotation matrix, and t denotes a translation vector.

That is, when the coordinate system {A} is rotated according to R and moved by t, the coordinate system {A} may become the same as the coordinate system {B}. In the disclosed embodiment, R and t are calculated using a least square method.

The similarity calculation unit 415 calculates similarity between a plurality of local maps and actual sensor data using the relative position of the actual sensor data for the local map calculated by the relative position calculation unit 413.

Figure 16:
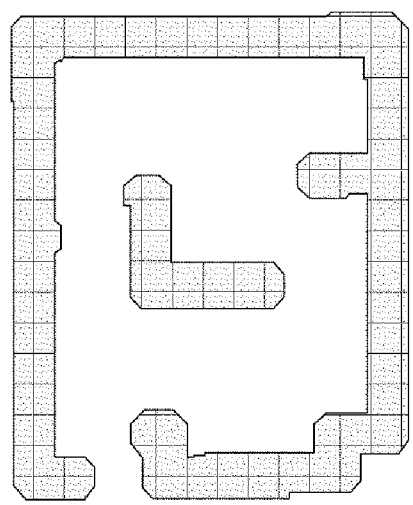
FIG. 16 is a view showing a state in which the local map is expanded according to an embodiment of the present disclosure.

The local map shown in FIG. 14 may be considered as a binary image. Thus, the local map may be expanded as shown in FIG. 16 using a dilation method among digital image processing methods, and similarity is calculated by fitting the actual sensor data into the expanded local map.

Figure 17:
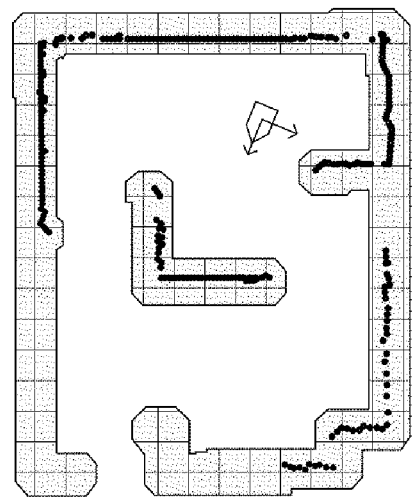
FIGS. 17 and 18 are views for explaining a state in which the actual sensor data is fitted into the local map according to an embodiment of the present disclosure.

As shown in FIG. 17, when the fitting between the local map and the actual sensor data is successfully performed, the number of overlapped portions between the actual sensor data and the expanded local map is increased, resulting in an increase in the similarity.

At this time, the similarity calculation unit 415 obtains higher similarity along with an increase in the number of data points which are commonly included in the local map and the actual sensor data.

Figure 18:
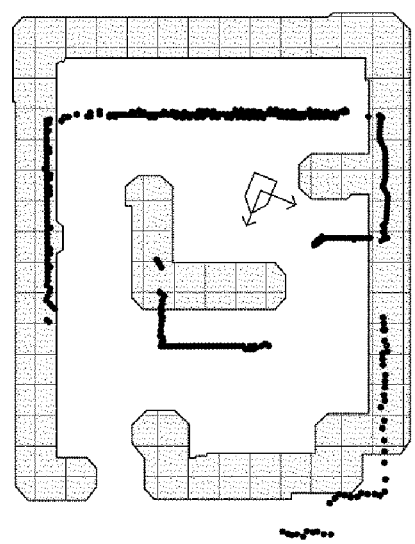

On the other hand, as shown in FIG. 18, when the number of data points which are commonly included in the local map and the actual sensor data is significantly smaller than that shown in FIG. 17 or zero, or when the coordinate transformation parameter is wrongly calculated, the similarity between the local map and the actual sensor data is reduced.

The position determination unit 417 determines the relative position of the cleaning robot 100 for the local map having the highest similarity using the similarity calculated by the similarity calculation unit 415 as the current position of the cleaning robot 100 for the environmental map, thereby determining current position coordinates.

Figure 19:
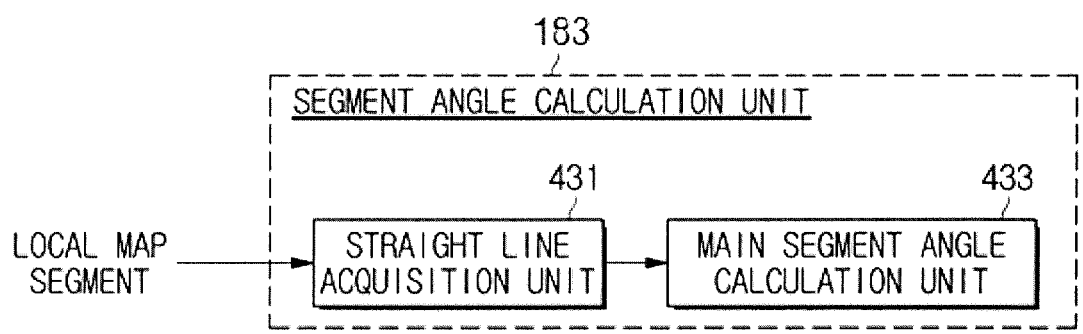
FIG. 19 is a view showing the segment angle calculation unit of FIG. 11, in detail.

Referring to FIG. 19, a segment angle calculation unit 183 may include a straight line acquisition unit 431 and a main segment angle calculation unit 433.

The straight line acquisition unit 431 may acquire a plurality of straight lines from the local map acquired by the local map acquisition unit 153. At this time, the straight line acquisition unit 431 may acquire the plurality of straight lines from the local map using Hough transform.

The plurality of straight lines may be a plurality of point sets constituting a straight line in the local map, or a plurality of point sets constituting the local map itself.

More specifically, the straight line acquisition unit 431 acquires the plurality of straight lines for the local map when a vote matrix is calculated by performing Hough transform using a plurality of points constituting the plurality of straight lines extracted from the local map. At this time, the row and column of the vote matrix respectively correspond to an angle of a line segment and a distance from the origin of the reference coordinate system. Each of the plurality of straight lines acquired according to the Hough transform has an angle.

The main segment angle calculation unit 433 may calculate the main segment angle by classifying the plurality of straight lines according to the angles.

More specifically, the main segment angle calculation unit 433 may generate an angle histogram by classifying the plurality of straight lines according to the angles, and determine the main segment angle in consideration of distribution of the angle histogram.

Figure 20:
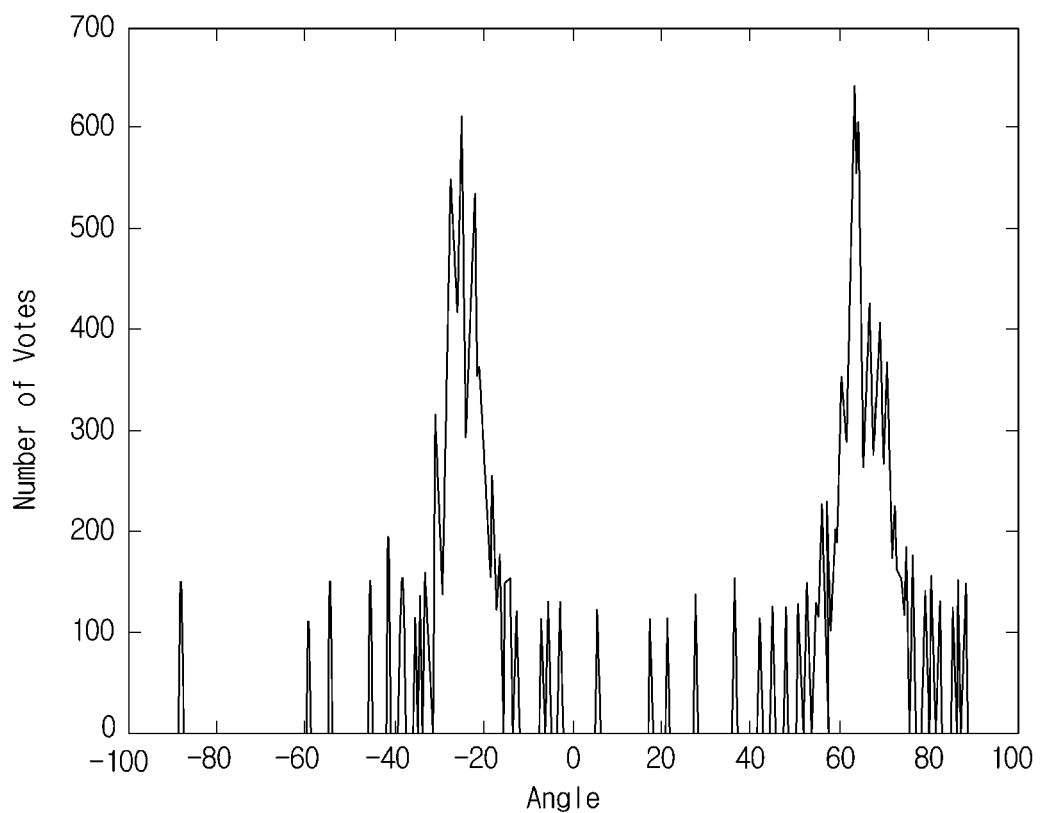
FIGS. 20 and 21 are angle histograms generated by classifying straight lines acquired by an edge local map according to angles.

For example, a distance of a line segment is not required in order to determine the traveling direction of the cleaning robot 100, and therefore the main segment angle calculation unit 433 may classify the straight lines acquired by the straight line acquisition unit 431 according to the angles as shown in FIG. 20, and convert the classified straight lines into the angle histogram.

In addition, the main segment angle calculation unit 433 may determine the main segment angle of the local map by removing noise of the angle histogram using a low pass filter.

Figure 21:
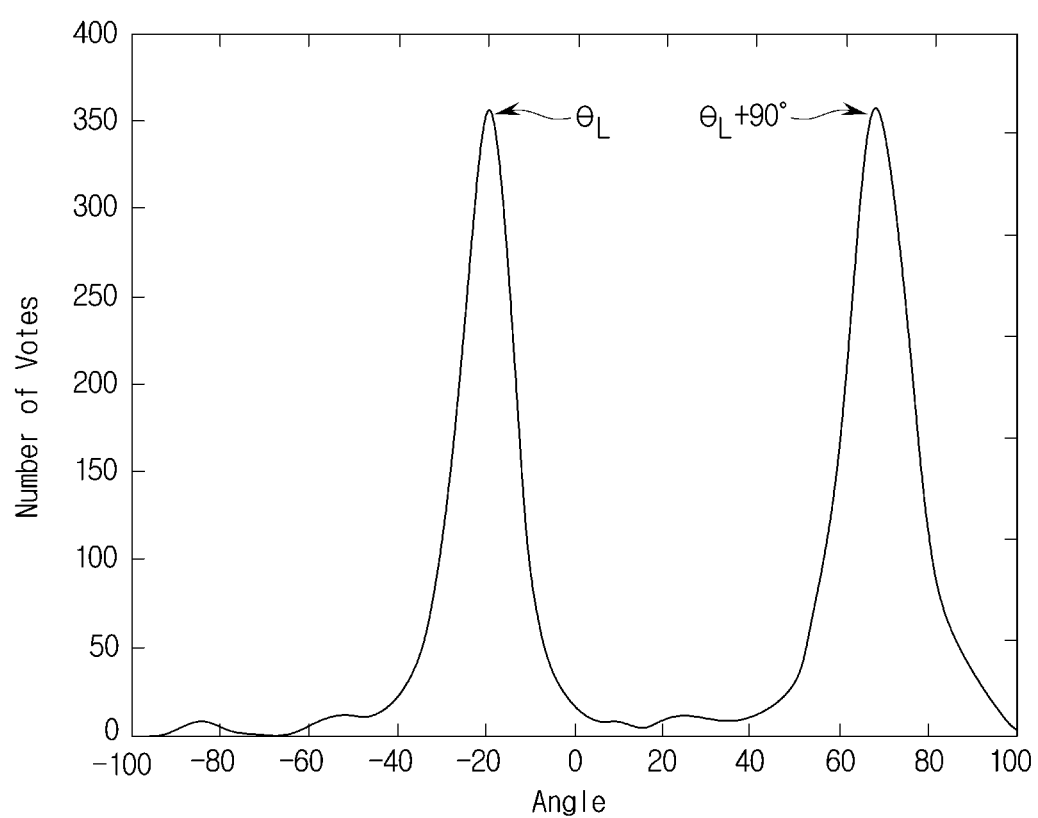

Referring to FIG. 21, the main segment angle calculation unit 433 may perform low pass filtering on the angle histogram, and determine an angle having a maximum vote value as the main segment angle of the local map.

In addition, the main segment angle calculation unit 433 may generate the angle histogram by merging the straight lines perpendicular or parallel to each other.

Specifically, the main segment angle calculation unit 433 may merge the straight lines having mutually different angles according to a preset condition. The main segment angle calculation unit 433 may merge the straight lines perpendicular to each other or the straight lines parallel to each other, thereby improving the reliability of distribution of the main segment angles.

For example, the main segment angle calculation unit 433 may classify the straight lines parallel to each other (180 degrees) into the same angle, or classify the straight lines perpendicular to each other (90 degrees) into the same angle. In this manner, the main segment angle calculation unit 433 may classify all of the straight lines into a specific range by classifying the straight lines perpendicular or parallel to each other into a single angle.

The main segment angle calculation unit 433 may generate the angle histogram in such a manner that the main segment angle exists in a range of −45° to +45° by merging the straight lines perpendicular or parallel to each other. Specifically, $\theta_L$ and $\theta_L+90°$ shown in FIG. 21 are perpendicular to each other. Accordingly, the main segment angle calculation unit 433 may classify $\theta_L+90°$ together with $\theta_L$ by moving $\theta_L+90°$ larger than +45° by 90°.

Meanwhile, the main segment angle calculation unit 433 may calculate an angle in which the largest number of straight line components are distributed as the main segment angle.

Referring to FIG. 21, the main segment angle calculation unit 433 may calculate $\theta_L$ in which the largest number of straight line components exist as the main segment angle. That is, the main segment angle calculation unit 433 may perform low pass filtering on the angle histogram, and then determine the angle having the maximum vote value as the main segment angle.

The direction adjustment unit 185 may determine the main segment angle in the current position of the cleaning robot 100 as the traveling direction, and rotate the cleaning robot 100 in place in the determined traveling direction.

Figure 22:
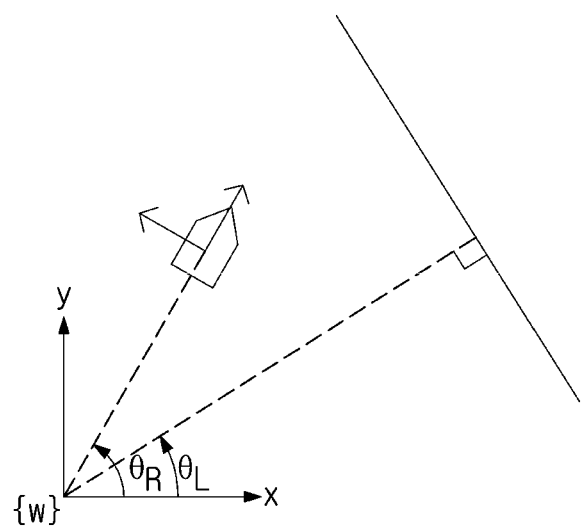
FIGS. 22 and 23 are views for explaining a method of determining a traveling direction of a cleaning robot.
Figure 23:
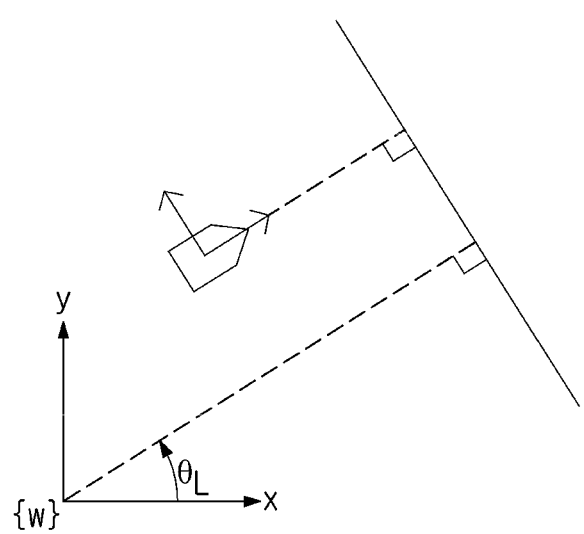

For example, when the cleaning robot 100 is positioned in a direction of a rotation angle $\theta_R$ based on the reference coordinate system {W} as shown in FIG. 22, the direction adjustment unit 185 may rotate the cleaning robot 100 in place so that the cleaning robot 100 is positioned in the same direction as $\theta_L$ that is the main segment angle.

The memory 160 may store the environmental map in which the cleaning robot 100 travels, an operating program for operating the cleaning robot 100 and a traveling pattern, position information of the cleaning robot 100 and obstacle information which are acquired in a traveling process, and the like.

In addition, in the memory 160, user input information such as control data for controlling the operation of the cleaning robot 100, reference data used during operation control of the cleaning robot 100, operation data generated while the cleaning robot 100 performs a predetermined operation, setting data input by the device 200 so that the cleaning robot 100 performs a predetermined operation, and the like may be stored.

In addition, the memory 160 may be implemented as a non-volatile memory device such as a ROM (read only memory), a PROM (programmable read only memory), an EPROM (erasable programmed read only memory), or a flash memory, a volatile memory device such as a RAM (random access memory), or a storage medium such as a hard disc, a card type memory (for example, SD or XD memory), or an optical disc. However, the memory 160 is not limited thereto, and a variety of storage media which can be considered by a designer may be used.

The input unit 171 may receive a variety of control information for operating the cleaning robot 100 through a user's operation.

The display unit 173 is a component for outputting information indicating that the traveling direction of that the cleaning robot 100 is completely adjusted according to the main segment angle, in the form of a message. At this time, the display unit 173 may display the information using icons or LED. The display unit 173 is not limited to a notification of the adjustment completion of the traveling direction of the cleaning robot 100, and may output a notification of current position determination even when the current position is determined.

In this manner, when the display unit 173 is an LCD UI (liquid crystal display user interface) in which icon or text display is possible, the display unit 173 may display localization and traveling direction adjustment state of the cleaning robot 100 using icons or texts so that a user may easily confirm the displayed information.

In addition, when the display unit 173 is an LED UI (light emitting diode user interface), the display unit 173 may display the traveling direction adjustment state of the cleaning robot 100 using lighting or blinking and a duration time difference so that the user may easily confirm the displayed information.

In addition, the display unit 173 may display input information of a user and an operating state of the cleaning robot 100 according to display control signals of the processor 180, and display a variety of information received from the cleaning robot 100, a variety of control commands received from a user through the device, and the like.

For example, the display unit 173 may display time setting, reservation setting, a time when a control command is directly input, or a speed of the cleaning robot 100, and in the other cases, the display unit 173 may display a current time, reservation information, a remaining battery amount, a movement distance, a movement route, and the like.

In addition, the display unit 173 may include at least one of an LCD (liquid crystal display), a TFT-LCD (thin film transistor-liquid crystal display), an OLED (organic light emitting diode), a flexible display, and a 3D display.

The sound output unit 175 is a component for outputting information indicating that the traveling direction of the cleaning robot 100 is completely adjusted according to the main segment angle in the form of voice. The sound output unit 175 is not limited to a notification of the adjustment completion of the traveling direction of the cleaning robot 100, and may output a notification of current position determination even when the current position is determined.

In addition, the sound output unit 175 may include a speaker that outputs the operating state of the cleaning robot 100 and the adjustment state of the traveling direction of the cleaning robot 100 according to sound control signals of the processor 180 using sound (for example, beep sound).

In addition, the sound output unit 175 may further include a DAC (digital-to-analog converter) that converts a digitalized electrical signal into an analog signal and an amplifier that amplifies an electrical signal turned into an analog signal by the DAC.

Figure 24:
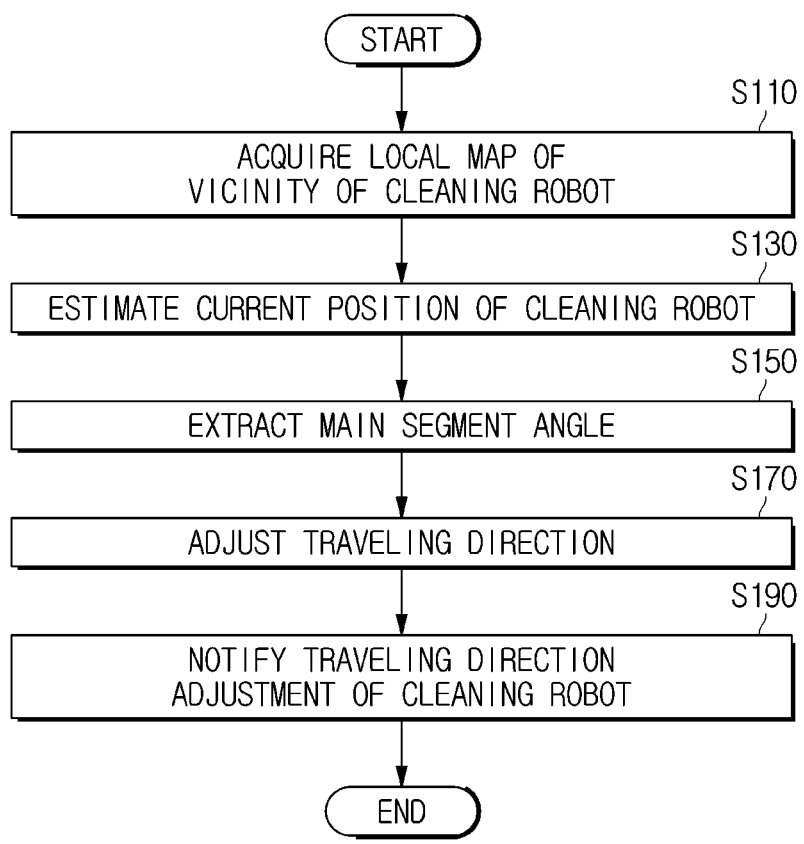
FIG. 24 is a flowchart showing a control method of a cleaning robot according to an embodiment of the present disclosure.
Figure 25:
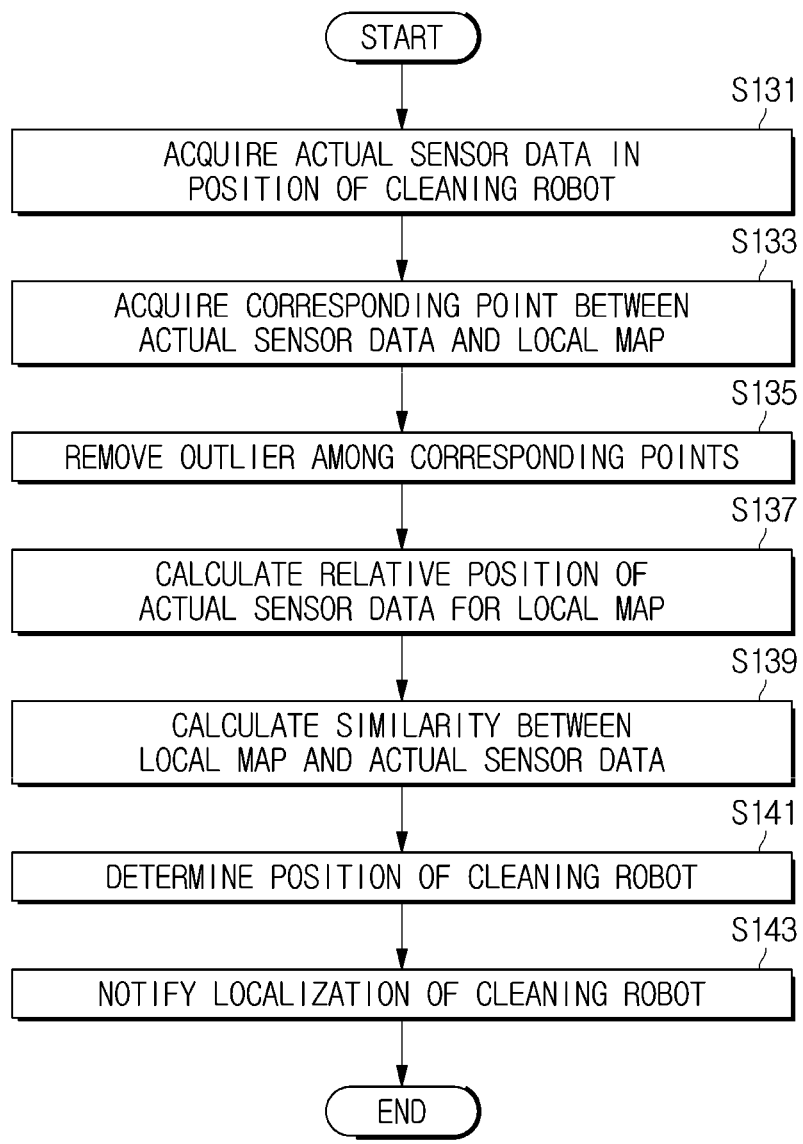
FIG. 25 is a flowchart showing a method of estimating a current position of the cleaning robot of FIG. 24.
Figure 26:
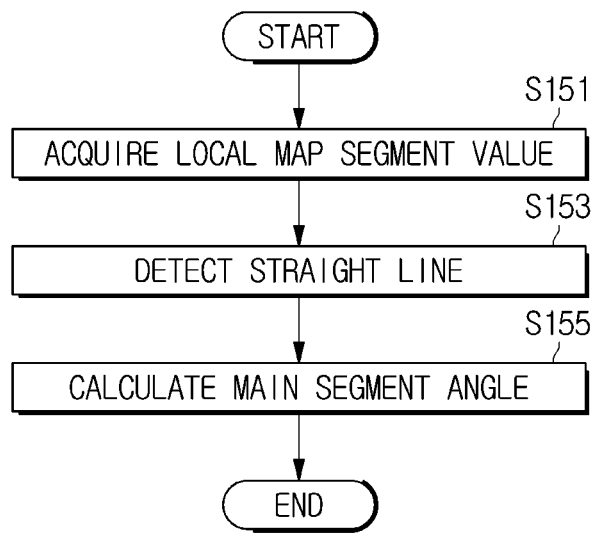
FIG. 26 is a flowchart showing a method of extracting a segment angle of FIG. 24.

FIG. 24 is a flowchart showing a control method of a cleaning robot according to an embodiment of the present disclosure, FIG. 25 is a flowchart showing a method of estimating a current position of the cleaning robot of FIG. 24, and FIG. 26 is a flowchart showing a method of extracting a segment angle of FIG. 24.

Referring to FIG. 24, in operation S110, the cleaning robot 100 may acquire a local map by scanning the vicinity of a current position.

At this time, the cleaning robot 100 may acquire the local map by scanning the vicinity of the current position based on an environmental map stored in advance in which the cleaning robot 100 travels. The environmental map may be a 2D grid map or a 3D grid map.

The case of above-described operation S110 may include a case in which the cleaning robot 100 is moved to a different position within a predetermined distance by a user during an operation.

The cleaning robot 100 may extract virtual sensor data by performing a ray casting method on all directions while rotating at 360 degrees in a virtual sensor data extraction position selected with respect to a current position of the cleaning robot 100 and thereby acquire the local map, or extract the local map (for example, a small local map or a large local map) having a preset size with respect to each of a plurality of local map extraction positions selected with respect to the current position of the cleaning robot 100. At this time, in a large local map method, an area wider than the small local map may be extracted from the environmental map using a position to which the cleaning robot 100 is moved as a center of large local map extraction.

Next, in operation S130, the cleaning robot 100 may acquire actual sensor data by measuring a distance from the current position to an object to be measured, and determine current position coordinates for the local map by performing matching between the local map and the actual sensor data.

Referring to FIG. 25, in operation S131, the cleaning robot 100 may acquire the actual sensor data by measuring the distance from the current position to the object to be measured.

More specifically, the cleaning robot 100 includes a sensor (not shown) for measuring a distance, and may acquire actual sensor data of a real environment in which the cleaning robot 100 is positioned by measuring a distance from the sensor to the object to be measured according to scanning of a 2D sensor or a 3D sensor installed in the cleaning robot 100. Alternatively, the cleaning robot 100 may acquire data outside FoV of the sensor while rotating at a predetermined angle in place, or acquire actual sensor data for all directions while rotating at an angle of 360 degrees in place.

Next, in operation S133, the cleaning robot 100 may acquire a plurality of corresponding points through data matching between the actual sensor data and the local map.

For example, the cleaning robot 100 may acquire corresponding points which correspond to each other between data points of actual sensor data defined as (x, y) based on a reference coordinate system and a plurality of data points of virtual sensor data defined as (x, y) based on a reference coordinate system of the environmental map.

Next, in operation S135, the cleaning robot 100 may remove outliers among the plurality of corresponding points.

Next, in operation S137, the cleaning robot 100 may calculate a relative position of the actual sensor data for the local map using the acquired plurality of corresponding points.

The cleaning robot 100 may calculate the relative position of the actual sensor data for the local map, that is, a coordinate transformation parameter (rotation and translation) using the plurality of corresponding points.

Next, in operation S139, the cleaning robot 100 may calculate similarity between a plurality of local maps and the actual sensor data.

At this time, higher similarity may be obtained along with an increase in the number of data points which are commonly included in the local map and the actual sensor data.

Next, in operation S141, the cleaning robot 100 may determine the relative position of the cleaning robot for the local map having the highest similarity as the current position of the cleaning robot for the environmental map. At this time, the current position of the cleaning robot may be provided in the form of current position coordinates.

Next, in operation S143, when the position of the cleaning robot 100 is determined, information indicating that the position of the cleaning robot 100 is completely recognized is notified to a user. In a method of notifying of the localization of the cleaning robot 100, the display unit 173 may display the localization through icons or lighting and blinking of LED or the sound output unit 175 may output sound (for example, beep sound), so that a user may easily confirm the notification. At this time, operation S143 may be omitted according to needs of an operator.

Next, in operation S150, the cleaning robot 100 may determine a traveling direction by calculating a main segment angle of a line segment existing in the local map.

Referring to FIG. 26, in operations S151 and 153, the cleaning robot 100 may acquire a plurality of straight lines from the local map.

Next, in operation S155, the cleaning robot 100 may classify the plurality of straight lines according to the angles and calculate the main segment angle.

Operation S155 may include an operation of classifying the plurality of straight lines according to the angles and generating an angle histogram and an operation of determining the main segment angle in consideration of distribution of the angle histogram.

In addition, operation S155 may further include an operation of merging the straight lines perpendicular or parallel to each other in the angle histogram.

Next, in operation S170, the cleaning robot 100 may adjust the traveling direction according to the calculated main segment angle.

Next, in operation S190, the cleaning robot 100 may output information indicating that the traveling direction of the cleaning robot is adjusted according to the main segment angle in the form of a message or sound.

Figure 27:
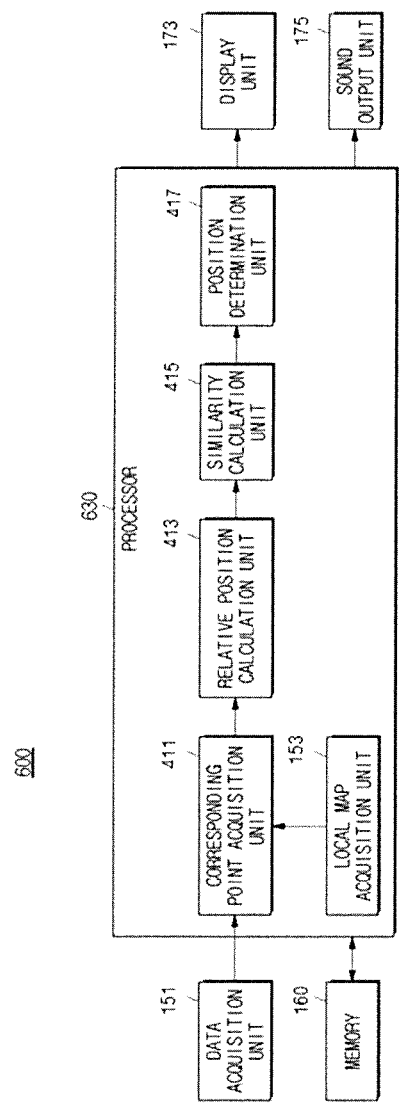
FIG. 27 is a control block diagram showing components of a localization apparatus for a cleaning robot according to an embodiment of the present disclosure.

FIG. 27 is a control block diagram showing components of a localization apparatus for a cleaning robot according to an embodiment of the present disclosure.

Hereinafter, detailed description of the same components described in FIGS. 3, 11, and 12 will be omitted.

Referring to FIG. 27, a localization apparatus 600 for the cleaning robot includes a data acquisition unit 151, a memory 160, a processor 630, a display unit 173, and a sound output unit 175.

The data acquisition unit 151 acquires actual sensor data in which the cleaning robot 100 is currently positioned, and measures a distance to an object to be measured according to scanning of a 2D sensor or a 3D sensor installed in the cleaning robot 100 and thereby acquires distance data of a real environment in which the cleaning robot 100 is positioned.

That is, as to the data acquisition unit 151, an actual sensor data acquisition method by the cleaning robot 100 may vary depending on FoV of the 2D sensor or the 3D sensor. When the FoV of the sensor is sufficiently secured, the cleaning robot 100 acquires actual sensor data in a stop state. Alternatively, the cleaning robot 100 acquires data outside the FoV of the sensor while rotating at a predetermined angle in place or acquires actual sensor data for all directions while rotating at an angle of 360 degrees in place.

The memory 160 stores an environmental map in which the cleaning robot 100 is operated, an operating program for operating the cleaning robot 100 and a traveling pattern, position information of the cleaning robot 100 and obstacle information which are acquired in a traveling process, and the like.

In addition, in the memory 160, user input information such as control data for controlling the operation of the cleaning robot 100, reference data used during operation control of the cleaning robot 100, operation data generated while the cleaning robot 100 performs a predetermined operation, setting data input by the device 200 so that the cleaning robot 100 performs a predetermined operation, and the like may be stored.

The processor 630 is a component that controls overall operations of the cleaning robot 100, and may recognize a relative position of the cleaning robot 100 for a local map by performing matching between the local map and sensor data. For this, the processor 630 further includes a local map acquisition unit 153, a corresponding point acquisition unit 411, a relative position calculation unit 413, a similarity calculation unit 115, and a position determination unit 117.

The local map acquisition unit 153 acquires a local map for the vicinity of a position to which the cleaning robot 100 is moved using virtual sensor data extracted based on an environmental map stored in the memory 160.

The corresponding point acquisition unit 111 acquires corresponding points through data matching between the actual sensor data acquired by the data acquisition unit 151 and the local map acquired by the local map acquisition unit 153.

The relative position calculation unit 413 calculates a relative position of the actual sensor data for the local map, that is, a coordinate transformation parameter (rotation and translation) using the corresponding points acquired by the corresponding point acquisition unit 411.

The similarity calculation unit 415 calculates similarity between a plurality of local maps and the actual sensor data using the relative position of the actual sensor data for the local map calculated by the relative position calculation unit 413. The local map may be considered as a binary image. The local map may be expanded using a dilation method among digital image processing methods, and the similarity is calculated by fitting the actual sensor data into the expanded local map. That is, the actual sensor data shown in FIG. 13 is fitted into the expanded local map shown in FIG. 16. The number of overlapped data points between the expanded local maps among data points of the actual sensor data may be used as the similarity.

As shown in FIG. 17, when the fitting between the local map and the actual sensor data is successfully performed, the number of overlapped portions between the actual sensor data and the expanded local map is increased, resulting in an increase in the similarity.

On the other hand, as shown in FIG. 18, when the number of data points which are commonly included in the local map and the actual sensor data is significantly small or zero, or when the coordinate transformation parameter is wrongly calculated, the similarity between the local map and the actual sensor data is reduced.

The position determination unit 417 determines the relative position of the cleaning robot 100 for the local map having the highest similarity using the similarity calculated by the similarity calculation unit 115 as the position of the cleaning robot 100 for the environmental map.

The display unit 173 displays information for notifying that the position of the cleaning robot 100 is completely recognized, using icons or LED.

The sound output unit 175 may include a speaker that outputs the operating state and localization state of the cleaning robot 100 according to sound control signals of the processor 630 using sound (for example, beep sound).

Hereinafter, a cleaning robot according to an embodiment of the present disclosure and an operation process and operation effect of a localization method of the cleaning robot will be described.

There frequently occurs a case in which the cleaning robot 100 operated in a complex environment such as general home is forcibly moved by a user, as necessary. For example, when the cleaning robot 100 is not able to move due to being stuck in the furniture while performing a cleaning operation, a user should lift and move the cleaning robot 100 to a different position. In this manner, when the position of the cleaning robot 100 is forcibly changed by a user while the cleaning robot 100 performs the cleaning operation, the cleaning robot 100 should quickly and accurately recognize a new position to which the cleaning robot is moved.

However, when the position to which the cleaning robot 100 is moved is recognized using an existing MCL method, the cleaning robot 100 should unnecessarily move a predetermined distance in an arbitrary direction in order to converge particles into one position so that a movement distance is increased, which is inefficient. In addition, a larger number of particles are required as much as possible in order to increase a success rate of the localization, so that a calculation time for the localization is increased.

Therefore, in the disclosed invention, there is proposed a method of quickly and accurately recognizing a current position of the cleaning robot 100 by scanning the vicinity of the position to which the cleaning robot 100 is moved while the cleaning robot 100 rotates at a predetermined angle or 360 degrees in place without unnecessary movement, when the cleaning robot 100 is moved to a different position within a predetermined distance by a user during an operation.

As described above, according to the disclosed invention, when the cleaning robot is moved to a different position within a predetermined distance by a user during an operation, a current position of the cleaning robot may be quickly and accurately recognized by scanning the vicinity of the position to which the cleaning robot is moved while the cleaning robot rotates at a predetermined angle or 360 degrees in place without unnecessary movement, thereby reducing a time required for the localization.

In addition, after the localization of the cleaning robot, information indicating that the localization is completed may be notified through a display or sound, thereby increasing user's reliability for a product.

In addition, the traveling direction of the cleaning robot may be determined using the environmental map in which the cleaning robot performs an operation and the position of the cleaning robot on the environmental map, and therefore a more accurate traveling direction may be determined so that a cleaning omission area is not generated, thereby improving reliability for a cleaning operation.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A cleaning robot comprising:
 a main body;
 a driving unit that moves the main body;
 a sensor to obtain actual sensor data a including current position data and measurement data;
 a data acquisition unit to acquire the actual sensor data, the data acquisition unit being configured to acquire the actual sensor data in one of a state in which the cleaning robot is stopped, a state while the cleaning robot rotates at a predetermined angle less than 360 degrees in place, and a state while the cleaning robot rotates at an angle of 360 degrees in place;
 a local map acquisition unit to acquire a local map for the vicinity of the current position of the cleaning robot based on the actual sensor data and an environmental map stored in advance, the local map being a portion of the environmental map including the current position of the cleaning robot, and having a plurality of line segments; and
 a processor to determine coordinates of the current position for the local map by performing matching between the local map and the actual sensor data, and to determine a traveling direction based on the current position by calculating a main segment angle of one of the plurality of line segments existing in the local map.

2. The cleaning robot according to claim 1, wherein the processor determines the main segment angle by classifying a plurality of straight lines existing in the local map according to angles.

3. The cleaning robot according to claim 1, wherein the processor causes the driving unit to rotate the cleaning robot in place based on the determined traveling direction.

4. The cleaning robot according to claim 1, wherein the local map acquisition unit extracts virtual sensor data by performing a ray casting method on all directions while the cleaning robot rotates at an angle of 360 degrees in a virtual sensor data extraction position selected with respect to the current position of the cleaning robot.

5. The cleaning robot according to claim 1, wherein the local map acquisition unit extracts the local map having a predetermined size with respect to the current position of the cleaning robot, from the environmental map.

6. The cleaning robot according to claim 1, wherein the processor is configured to:
 determine current position coordinates of the cleaning robot for the local map,
 calculate a main segment angle of a line segment existing in the local map, and
 cause the driving unit to rotate the traveling direction of the cleaning robot in the current position according to the main segment angle.

7. The cleaning robot according to claim 6, wherein the determination of the current position coordinates includes:

acquiring a plurality of corresponding points through data matching between the actual sensor data and the local map,
calculating a relative position of the actual sensor data for the local map using the acquired plurality of corresponding points,
calculating a similarity between a plurality of local maps and the actual sensor data, and
determining a relative position of the cleaning robot for the local map having the highest similarity as the current position of the cleaning robot for the environmental map.

8. The cleaning robot according to claim 7, wherein the calculating a similarity obtains higher similarity along with an increase in the number of data points which are commonly included in the local map and the actual sensor data.

9. The cleaning robot according to claim 6, wherein the processor is further configured to:
acquire a plurality of straight lines from the local map, and
classify the plurality of straight lines according to angles and to determine the main segment angle.

10. A control method of a cleaning robot, comprising:
sensing actual sensor data including current position data and measurement data;
acquiring a local map for the vicinity of a current position of the cleaning robot based on the current position data, the local map having a plurality of line segments;
acquiring the actual sensor data in one of a state in which the cleaning robot is stopped, a state while the cleaning robot rotates at a predetermined angle less than 360 degrees in place, and a state while the cleaning robot rotates at an angle of 360 degrees in place;
determining current position coordinates for the local map by performing matching between the local map and the actual sensor data;
determining a traveling direction of the cleaning robot by calculating a main segment angle of one of the plurality of line segments existing in the local map; and
adjusting the traveling direction based on the calculated main segment angle.

11. The control method of the cleaning robot according to claim 10, wherein the acquiring of the local map includes acquiring the local map by scanning the vicinity of the current position of the cleaning robot based on an environmental map stored in advance, the environmental map covering an area over which the cleaning robot travels.

12. The control method of the cleaning robot according to claim 10, wherein the acquiring of the local map includes:
extracting virtual sensor data by performing a ray casting method on all directions while the cleaning robot rotates at an angle of 360 degrees in a virtual sensor data extraction position selected with respect to the current position of the cleaning robot, or
extracting the local map having a predetermined size with respect to the current position of the cleaning robot, from the environmental map.

13. The control method of the cleaning robot according to claim 10, wherein the determining of the current position coordinates includes:
acquiring a plurality of corresponding points through data matching between the actual sensor data and the local map,
calculating a relative position of the actual sensor data to the local map using the acquired plurality of corresponding points,
calculating a similarity between a plurality of local maps and the actual sensor data, and
determining the relative position of the cleaning robot to the local map having the highest similarity as the current position of the cleaning robot for the environmental map.

14. The control method of the cleaning robot according to claim 13, wherein the calculating of the similarity includes determining that higher similarity is obtained along with an increase in the number of data points which are commonly included in the local map and the actual sensor data.

15. The control method of the cleaning robot according to claim 10, wherein the determining of the traveling direction includes:
acquiring a plurality of straight lines from the local map, and
calculating the main segment angle by classifying the plurality of straight lines according to angles.

16. The control method of the cleaning robot according to claim 15, wherein the calculating of the main segment angle includes:
generating an angle histogram by classifying the plurality of straight lines according to the angles, and
determining the main segment angle in consideration of distribution of the angle histogram.

\* \* \* \* \*